United States Patent
Hisa

(10) Patent No.: US 6,188,503 B1
(45) Date of Patent: Feb. 13, 2001

(54) OPTICAL DEFLECTOR AND OPTICAL SCANNER

(75) Inventor: Fumiya Hisa, Ebina (JP)

(73) Assignee: Fuji Xerox Co., Ltd., Tokyo (JP)

(*) Notice: Under 35 U.S.C. 154(b), the term of this patent shall be extended for 0 days.

(21) Appl. No.: 09/455,450

(22) Filed: Dec. 6, 1999

(30) Foreign Application Priority Data

Dec. 18, 1998 (JP) .................................................. 10-361012

(51) Int. Cl.⁷ .................................................. G02B 26/08
(52) U.S. Cl. .................... 359/200; 359/198; 359/216; 310/90.5
(58) Field of Search .................... 359/198, 200, 359/216, 217, 218, 219; 310/67 R, 90, 90.5

(56) References Cited

U.S. PATENT DOCUMENTS

| | | | |
|---|---|---|---|
| 5,963,353 | * 10/1999 | Shibuya et al. | 359/198 |
| 6,031,651 | * 2/2000 | Nakasugi | 359/198 |
| 6,064,130 | * 5/2000 | Konno et al. | 359/200 |

FOREIGN PATENT DOCUMENTS

| | | |
|---|---|---|
| 58-196564 | 12/1983 | (JP) . |
| 63-259510 | 10/1988 | (JP) . |
| 2-266856 | 10/1990 | (JP) . |
| 3-249418 | 11/1991 | (JP) . |
| 4-107313 | 4/1992 | (JP) . |
| 5-249398 | 9/1993 | (JP) . |
| 6-165428 | 6/1994 | (JP) . |
| 6-186491 | 7/1994 | (JP) . |

* cited by examiner

Primary Examiner—Darren Schuberg
(74) Attorney, Agent, or Firm—Oliff & Berridge

(57) ABSTRACT

Discloses an optical deflector that enables a rotary polygon mirror to rotate at high speed with high reliability and a low noise level, and can prevent the rotary polygon mirror from disengaging from a stationary axis with a compact and simple construction, and an optical scanner including the optical deflector. A disengagement prevention member is mounted at the tip of a stationary axis. Since a gap is formed between the stationary axis and a rotary axis and prevents friction by rotation, a rotary polygon mirror can be rotated at higher speed. There is no or less noise and vibration due to the rotation of the rotary polygon mirror, so that durability and reliability are improved. Even if a rotor moves in the axial direction, the rotor is prevented from disengaging by the disengagement prevention member, so that it never disengages accidentally from the stationary axis.

9 Claims, 16 Drawing Sheets

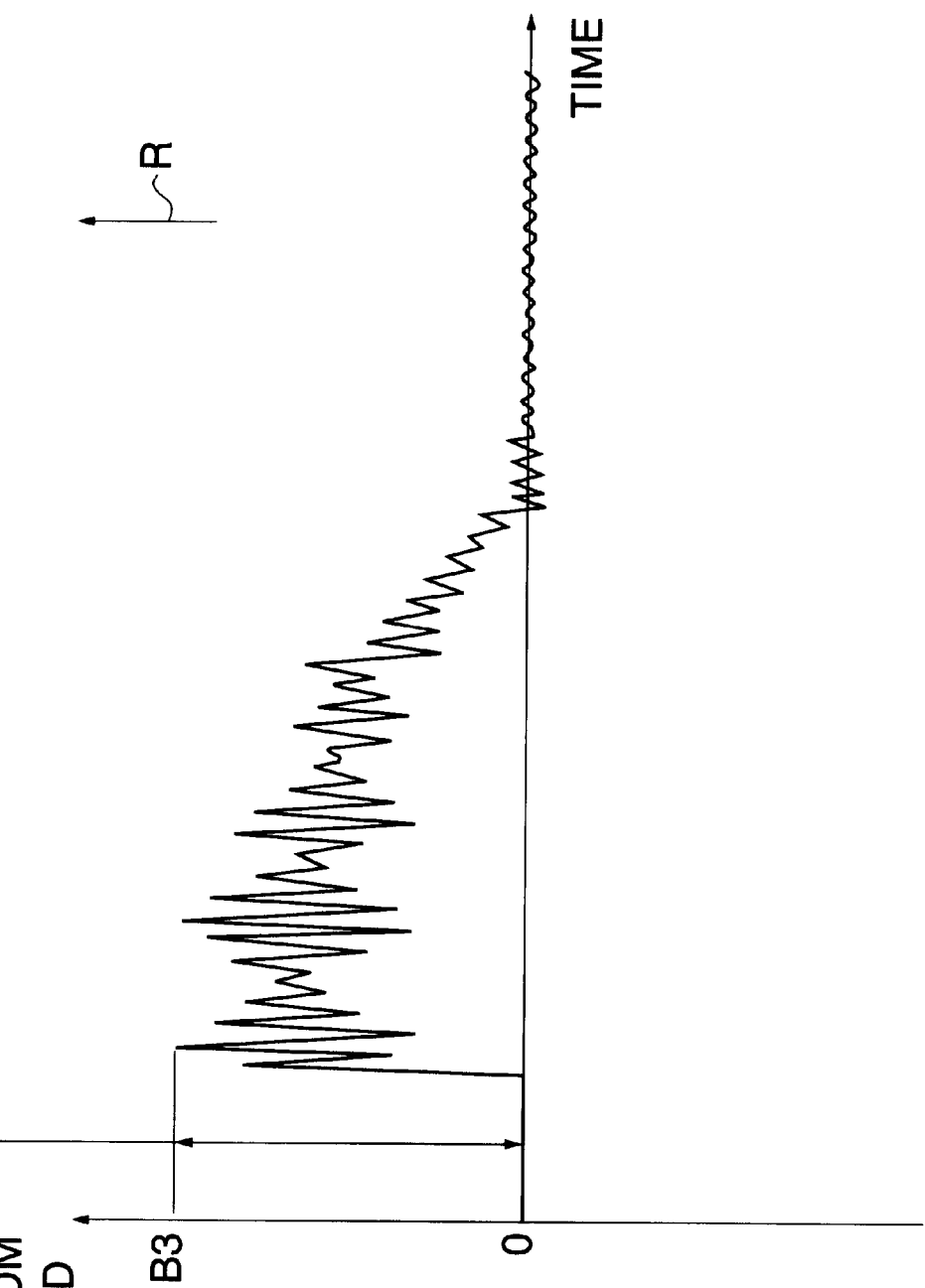

OPTICAL DEFLECTOR AND OPTICAL SCANNER

BACKGROUND OF THE INVENTION

1. Field of the Invention

The present invention relates to an optical deflector and an optical scanner including the optical deflector, which are applied to, for example, image formation apparatuses such as a laser printer, a facsimile, and a copier.

2. Description of the Related Art

FIG. 15 shows an example of a conventional optical deflector 310 applied to an image formation apparatus (Japanese Published Unexamined Patent Application No. Sho 63-259510).

In the optical deflector 310, a rotary axis 314 provided with a mirror 312 is fitted to a stationary axis 316, and a thrust magnet 326 mounted on the top end of the rotary axis 314 is disposed between a thrust magnet 318 mounted on the top end of the stationary axis 316 and a top magnet 324 mounted on the top cover 322 of a case 320. By repelling the thrust magnet 326 mutually by the thrust magnet 318 and the top magnet 324, the rotor is floated to hold it at a predetermined position. Thereby, a so-called dynamic pressure air bearing is constituted, making it possible to rotate the rotor fast and stably. The thrust magnet 326 of the rotor 314 is opposite to the top magnet 324 of the top cover 322 with a small gap, with the result that disengagement of the rotor from the stationary axis 316 is prevented.

However, since three magnets are required to float the rotor, the number of parts of the optical deflector 310 itself increases, resulting in a higher cost. Also, the case 320 requires the top cover 322 to mount the top magnet 324, boosting cost again. In addition, such a vertical placement of the three magnets in the vicinity of the top end of the stationary axis 316 makes it difficult to make the optical deflector 310 a flat construction, causing expansion of the optical deflector 310 itself in the axial direction.

On the other hand, in an optical deflector 340 shown in FIG. 16 (see Japanese Published Unexamined Patent Application No. Hei 5-249398), a ring-shaped groove 346 is provided in the circumference of a rotor yoke 344 secured to a rotary axis 342. By inserting, in the groove 346 in a not-contacted manner, one end of an anchoring member 350 provided in a housing 348, disengagement of a rotary member is prevented.

In an optical deflector shown in FIG. 17 (see Japanese Published Unexamined Patent Application No. Hei 6-165428), disengagement of a rotor is prevented by a disengagement prevention plate 386 mounted between a polygon mirror 382 and a rotor magnet 384.

However, since these optical deflectors 340 and 380 rotatably hold a rotating member by a so-called dynamic fluid bearing, it is difficult to rotate a rotating member at high speed, in comparison with the optical deflector 310 employing a dynamic airbearing shown in FIG. 15. In the case of the dynamic fluid bearing, when the optical deflectors 340 and 380 are, for example, horizontally, obliquely, or inversely placed, to prevent possible leak of lubricating fluid, the dynamic fluid bearing must be sealed in the circumference thereof, making the construction complicated.

Furthermore, since the dynamic fluid bearing constructionally requires that a mechanism for disengagement prevention be provided in the vicinity (a portion larger the diameter) of the outer circumference of a rotating member, contact between the anchoring member 350 and the ring-shaped groove 346 in the optical deflector 340 shown in FIG. 16 might cause so-called rotation unbalance in the rotating member.

SUMMARY OF THE INVENTION

In view of such facts, present invention provides an optical deflector that enables a rotary polygon mirror to rotate at high speed with high reliability and a low noise level, and can prevent the rotary polygon mirror from disengaging from a stationary axis with a compact and simple construction, and an optical scanner including the optical deflector.

The optical deflector preferably comprises a stationary axis; a rotor including at least a rotary axis disposed with a predetermined gap from the stationary axis and capable of rotating about the stationary axis, a rotary polygon mirror rotating integrally with the rotary axis, and driving magnets attached to at least one of the rotary axis and the rotary polygon mirror; holding magnets for holding the rotor at a predetermined holding position in the axial direction of the stationary axis by magnetic force; and a disengagement prevention member, mounted in the vicinity of an end of the stationary axis in the axial direction with a predetermined gap in the axial direction from the rotor, coming into contact with the rotor moving in the axial direction and preventing the rotor from disengaging from the stationary axis.

Accordingly, magnetic force acting on the driving magnets acts on the rotor as rotation driving force, causing the rotor to rotate. Since the rotary polygon mirror making up the rotor also rotates, light irradiated on the rotary polygon mirror is subjected to main scanning.

A predetermined gap is maintained between the stationary axis and the rotary axis making up the rotor, which serves as so-called dynamic air bearing. The rotor is held at a predetermined position in the axial direction of the stationary axis by the magnetic force of the holding magnets. By virtue of this construction, the rotary polygon mirror can be rotated at high speed, and for example, if an optical scanner including the optical deflector is applied to an image formation apparatus, images of high quality can be formed at high speed. Also, no contact between the stationary axis and the rotary axis and the nonexistence of other members intervening therebetween cause no noise and vibration, increasing durability and reliability.

A disengagement prevention member is provided in the vicinity of an end of the stationary axis. Therefore, with a simple construction and at a low cost, the rotor can be prevented from disengaging from the stationary axis when moving in the axial direction with respect to the stationary axis. Since the disengagement prevention member is also provided with a predetermined gap from the rotor and is not in contact with the rotor, the rotor can be rotated at high speed. Also, since no noise or less noise and vibration occur, high durability and reliability are maintained.

BRIEF DESCRIPTION OF THE DRAWINGS

Preferred embodiments of an optical deflector and an optical scanner according to the present invention will be described in detail based on the drawings:

FIG. 3 is a cross-sectional view of an optical deflector according to a second embodiment of the present invention.

FIG. 4 is a graph showing a relationship between the length of a gap between a rotor and the disengagement prevention member in the optical deflector according to the second embodiment of the present invention and the magnetic force of floating magnets.

FIG. 5 is a cross-sectional view of an optical deflector according to a third embodiment of the present invention.

FIG. 6 is a graph showing a relationship between the length of a gap between the rotor and the disengagement prevention member in the optical deflector according to the third embodiment of the present invention and the magnetic force of floating magnets.

FIG. 7 is a graph qualitatively showing time vibration of the rotor in the optical deflector according to the third embodiment of the present invention in the axial direction at the initial stage of rotation;

FIG. 8 is a cross-sectional view of an optical deflector according to a fourth embodiment of the present invention.

FIG. 9 is a graph showing a relationship between the length of a gap between the rotor and the disengagement prevention member in the optical deflector according to the fourth embodiment of the present invention and the magnetic force of floating magnets.

FIG. 11 is a view of a disengagement prevention member of the present invention with flat spring slips formed.

DESCRIPTION OF THE PREFERRED EMBODIMENTS

First Embodiment

Figure 1:
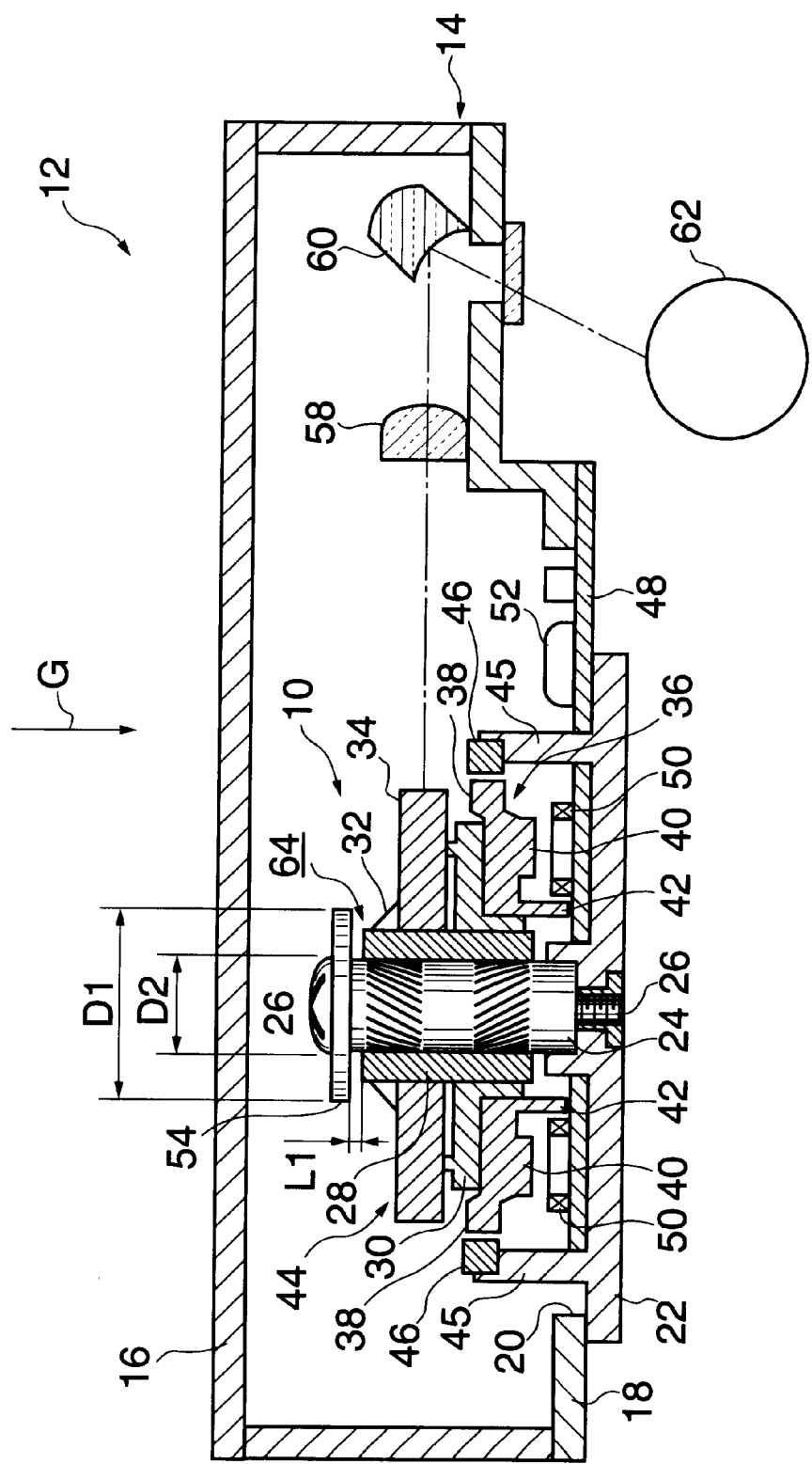
FIG. 1 is a cross-sectional view of an optical scanner to which an optical deflector according to a first embodiment of the present invention is applied.

FIG. 1 is a cross-sectional view of an optical scanner 12 in which an optical deflector 10 according to a first embodiment of the present invention is adopted.

The optical scanner 12 has a housing 14 with an open top surface and a cover 16 for covering the top surface of the housing 14. A mounting hole 20 is formed in a bottom plate 18 of the housing 14, and a base member 22 of the optical deflector 10 is secured to the housing 14 in a manner that covers the mounting hole 20.

A stationary axis 24 of approximately cylindrical shape is secured to a base material 22 by fixing screws 26. In the circumference of the stationary axis 24, a rotary axis 28 of approximately cylindrical shape is held with a small gap from the stationary axis 24 and at a predetermined position in the axial direction of the stationary axis 24 (hereinafter, the unmodified term "axial direction" refers to the axial direction of the stationary axis 24). An optical deflector 10 of the first embodiment is placed horizontally, and the axial direction thereof matches the gravitational direction (indicated by the arrow G) and the opposite direction thereof.

The rotary axis 28 is provided with a flange 30 that extends from an approximately central position in the axial direction outward in the diametrical direction. A rotary polygon mirror 34 is secured to the top surface of the flange 30 by fixing members 32.

Magnet members 36 are secured to the bottom surface of the flange 30. The magnet members 36 include floating magnets 38 mounted in the outer ends of the diametrical direction, driving magnets 40 mounted midway in the diametrical direction and magnetized in multipolar direction, and FG magnets 42 mounted in the inner ends of the diametrical direction and magnetized in multipolar direction. A rotor 44 of the present invention is constituted by the above described rotary axis 28, flange 30, rotary polygon mirror 34, fixing members 32, and magnet members 36 (floating magnets 38, driving magnets 40, and FG magnets 42).

On the other hand, in the base member 22, walls 45 are erected in the circumference of the stationary axis 24. Floating magnets 46 are secured to the walls 45 in opposed relation to the floating magnets 38. Pairs of the floating magnets 38 of the rotor 44 and the floating magnets 46 of the base member 22 float the rotor 44 to a predetermined position in the axial direction by magnetic force thereof. Hereinafter, the unmodified term "predetermined position" refers to a position to which the rotor 44 has been thus floated by the magnetic force of the floating magnets 38 and 46.

Furthermore, a circuit board 48 is mounted on the base member 22. Position detection elements (not shown) such as a hole element are mounted on the circuit board 48, and coils 50 corresponding to the position detection elements are secured in opposed relation to the driving magnets 40. When the position of the rotor 44 is detected by the position detection elements, the coils 50 are switched to be energized based on the position information so that the rotor 44 is driven to rotate about the stationary axis 24.

On the circuit board 48, a rotation number detection element (not shown) such as an FG pattern is mounted at the position opposite to the FG magnets 42 and a driving circuit element 52 for controlling the coils 50 is mounted. The number of rotations of the rotor 44 is detected by the rotation number detection element and the driving circuit element 52 controls the rotor 44 to a constant speed, based on the rotation number information. When the rotary polygon mirror 34 thus operating at a constant speed is irradiated with a light beam corresponding to image information, the beam is reflected by the rotary polygon mirror 34 and deflected by the rotation of the rotary polygon mirror 34.

Figure 2:
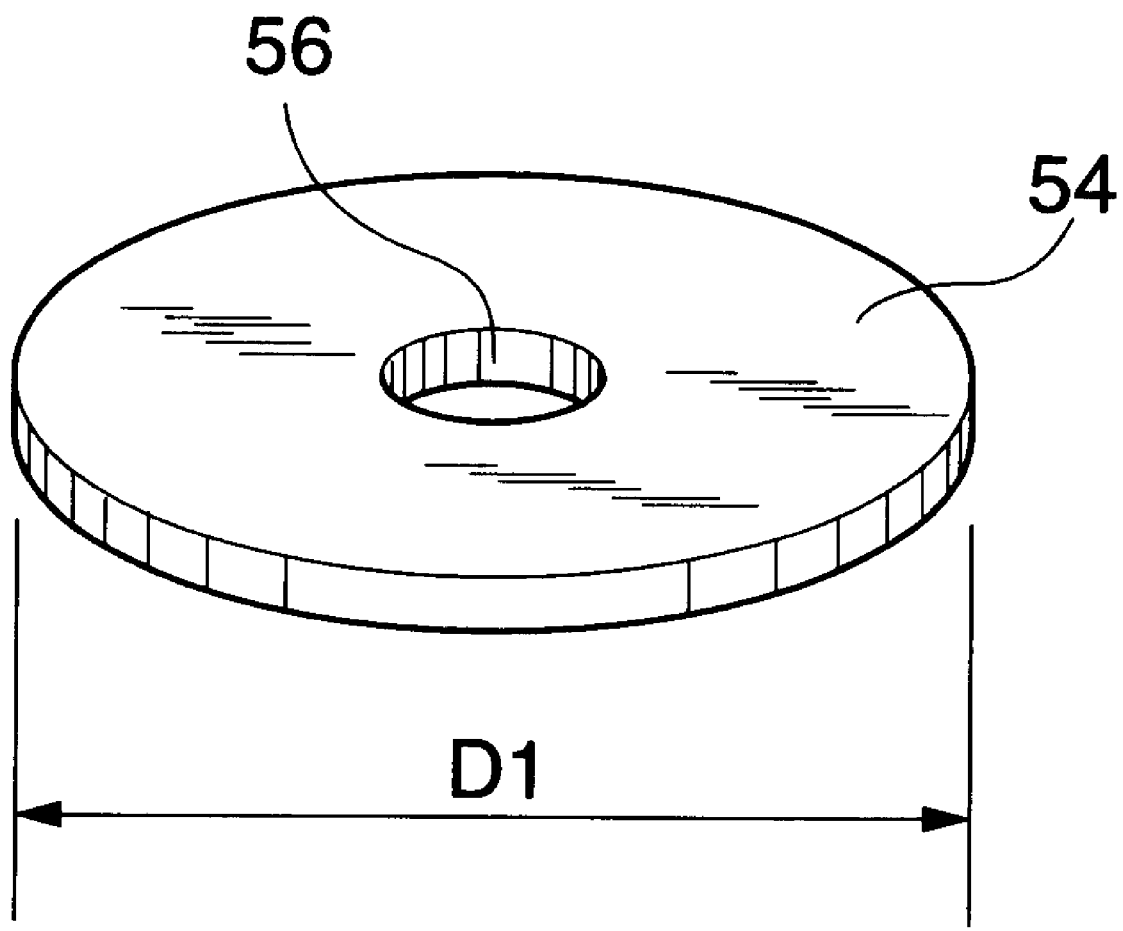
FIG. 2 is a perspective view of a disengagement prevention member of the optical deflector of the present invention.

A disengagement prevention member 54 is mounted at the tip of the stationary axis 24. As shown in FIG. 2, the disengagement prevention member 54 is a ring-shaped member with a hole 56 formed at the center and the outer diameter D1 thereof is larger than the inner diameter D2 of the rotor 44 (more strictly, the inner diameter of the rotary axis 28). When the rotor 44 moves toward the disengagement prevention member 54 (moves upward in the first embodiment), the rotor 44 contacts the disengagement prevention member 54 at the inner end in the diametrical direction (the vicinity of a portion of the smallest radius thereof).

The fixing screws 26 are inserted in the hole 56 of the disengagement prevention member 54 and screwed at the center of the stationary axis 24. Thereby, the disengagement prevention member 54 is tightened together with the stationary axis 24 by the fixing screws 26 and a gap 64 of a predetermined length L1 is formed between one end of the rotor 44 in the axial direction and the disengagement prevention member 54.

An optical lens 58 and an optical mirror 60 for imaging a light beam deflected by the optical deflector 10 are attached to the housing 14. The light beam imaged by the optical lens 58 and the optical mirror 60 is imaged on the surface of a photosensitive drum 62 rotatably mounted in the housing of an image formation apparatus (not shown). By the light beam being deflected by the optical deflector 10, the beam travels in the axial direction of the photosensitive drum 62 on the surface of the photosensitive drum 62 and is subjected to main scanning. The rotation of the photosensitive drum 62 causes the beam to be subjected to sub scanning on the surface of the photosensitive drum 62. By the main scanning and sub scanning, an image is formed on the surface of the photosensitive drum 62. The optical scanner 12 of the present invention comprises the above-described optical deflector 10, the optical lens 58, the optical mirror 60, and the photosensitive drum 62.

Next, a description will be made of the operation and effects of the optical deflector 10 according to the first embodiment and the optical scanner 68 including the optical deflector 10.

The rotor 44 is floated by the magnetic force of the floating magnets 38 and 46 and the rotary polygon mirror 34 is held at a predetermined position in the axial direction. Based on position information of the rotor 44 detected by a position detection element not shown, the coils 50 are switched to be energized so that the rotor 44 is driven to rotate at a given angular speed about the stationary axis 24. At this time, a gap is formed between the stationary axis 24 and the rotary axis 28 (so-called dynamic pressure air bearing), so that there is no friction caused by the rotation. Also, a gap 64 is formed between the rotor 44 and the disengagement prevention member 54. Accordingly, the rotary polygon mirror 34 can be made to rotate at higher speed than conventional ones using ball bearings or fluid bearings. If the optical scanner 12 provided with the optical deflector 10 is applied to an image formation apparatus to form images, images of high quality can be formed at high speed. Since there is no contact between the stationary axis 24 and the rotor 44 and there is no other member intervening therebetween, there is no noise and vibration due to the rotation of the rotary polygon mirror 34, so that durability and reliability are improved.

The disengagement prevention member 54 is mounted at the tip of the stationary axis 24. Therefore, even if the rotor 44 moves in the axial direction due to vibration or impact in the process of transportation or use of the optical deflector 10 (or the optical scanner 12 or an image formation apparatus including the optical deflector 10), the rotor 44 is prevented from disengaging by the disengagement prevention member 54, so that it never disengages accidentally from the stationary axis 24. Particularly, in the optical deflector 10 of the first embodiment, as seen from FIG. 1, the gravity direction (the direction of the arrow G) is the reverse of the direction in which the rotor 44 disengages. Therefore, even if the rotor 44 temporarily shifts from a predetermined position in the axial direction toward the disengagement prevention member 54, the rotor 44 will return to the predetermined position by the gravity. Consequently, the optical deflector 10 can be thereafter used without trouble.

The rotor 44 contacts the disengagement prevention member 54 in the vicinity of a portion of the smallest radius thereof. Therefore, even if the rotor 44 contacts the disengagement prevention member 54 during rotation, so-called rotation unbalance (the rotation center of the rotor 44 deviates from the axial core of the stationary axis 24) does not occur, so that high quality is maintained.

Furthermore, the gap between the stationary axis 24 and the rotary axis 28 is substantially covered from above by the disengagement prevention member 54. Thereby, dust and motes within the optical scanner 12 are prevented to invade the gap, arresting the occurrence of so-called bearing dragging (dust and the like invaded between the stationary axis 24 and the rotary axis 28 make it impossible to keep them in a noncontact state, locking the bearing and inhibiting the rotary axis 28 from rotating) and other phenomena. Particularly, immediately after the rotor 44 stops, since dust and the like are plentiful in the circumference of the rotating rotor 44, if the disengagement prevention member 54 were not mounted, dust and the like would invade the gap between the stationary axis 24 and the rotary axis 28, causing bearing dragging at the time of the next rotation. However, this is impossible with the optical deflector 10 of the first embodiment.

For this reason, the optical deflector 10 of the first embodiment does not require formation of a groove or level difference in the stationary axis 24 and the rotor 44 to prevent the rotor 44 from disengaging and change of the shape and installation position of the cover 16, ensuring the prevention of the disengagement of the rotor 44 with a simple construction and at low cost. The disengagement prevention member 54 can be later added to the optical deflector 10 if not provided with. Also, constructionally, the rotary polygon mirror 34 is not covered upward by the cover 16 or the like. Therefore, the space can be used as a light path, providing greater freedom in the layout of the optical deflector 10 and the optical scanner 12.

Second Embodiment

Figure 3A:
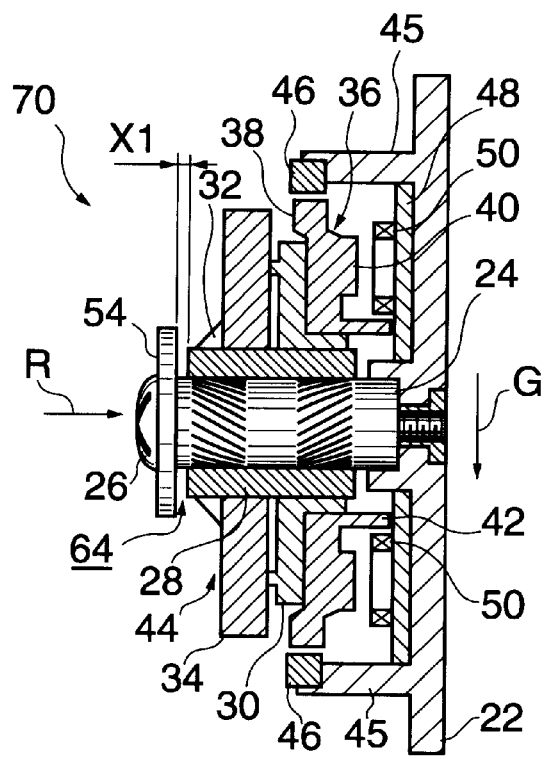
FIG. 3A shows the vertical placement of the optical deflector.
Figure 3B:
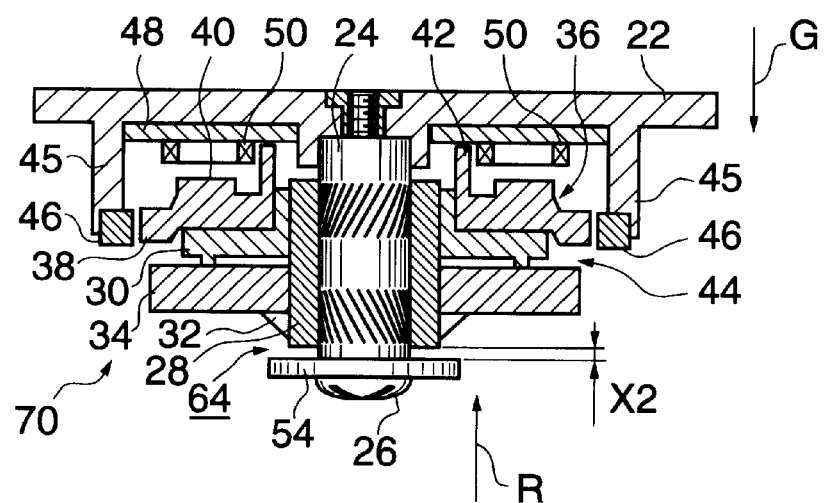
FIG. 3B shows the inverted placement of the optical deflector.

FIGS. 3A and 3B are the respective views of the horizontal placement and inverted placement of an optical deflector 70 of a second embodiment of the present invention. Since a basic configuration of the optical deflector 70 of the second embodiment is the same as that of the optical deflector 10 of the first embodiment, identical components and members are assigned identical reference numerals and a description of them is omitted. In FIGS. 3A and 3B, only the optical deflector 70 is shown and an overall configuration of an optical scanner is omitted. However, the overall configuration of an optical scanner is also the same as that of the first embodiment.

In the optical deflector 70 of the second embodiment, a gap 64 formed between one end of the rotor 44 in the axial direction and the disengagement prevention member 54 is set to predetermined lengths X1 and X2 for the horizontal placement and the inverted placement of the optical deflector 70, respectively.

Specifically, as shown in FIG. 3A, when the optical deflector 70 is horizontally placed, the direction (indicated by the arrow R) in which the rotor 44 returns to a predetermined position after moving toward the disengagement prevention member 54 and the gravity direction (indicated by the arrow G) are orthogonal to each other and the gravity does not act to return the rotor 44 to the predetermined position. As shown in FIG. 3B, when the optical deflector 70 is inversely placed, since the direction in which the rotor 44 returns to a predetermined position, and the gravity direction are reverse, the rotor 44 attempts to move further toward the disengagement prevention member 54 due to the gravity acting on the rotor 44.

Therefore, in the optical deflector 70 of the second embodiment, in order that the rotor 44 can be returned to a predetermined position by the magnetic force of the floating magnets 38 and 46, the gap 64 is set to a predetermined length X1 or X2 to limit a movement range of the rotor 44 in the axial direction.

Figure 4A:
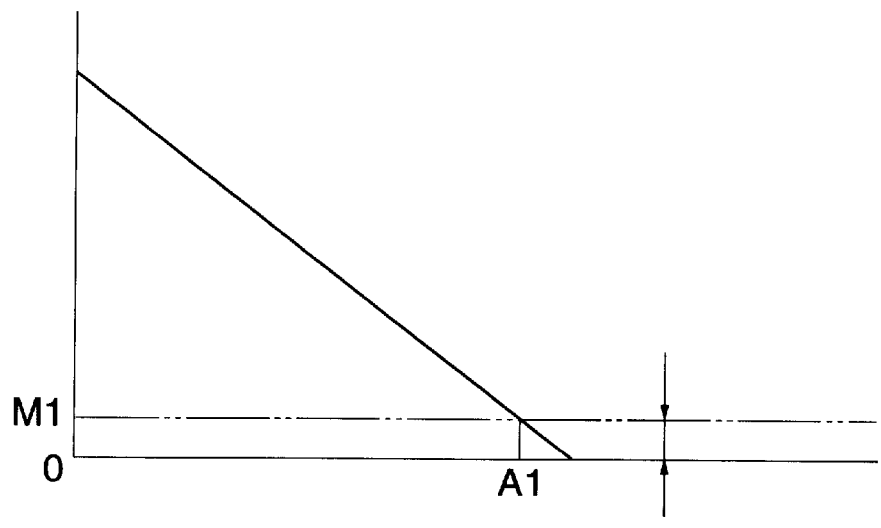
FIG. 4A shows the vertical placement of the optical deflector.

For example, as shown in FIG. 3A, when the optical deflector 70 is horizontally placed, the disengagement prevention member 54 is attached to the stationary axis 24 so that the length X1 of the gap 64 is shorter than a predetermined length A1 (see FIG. 4A). The predetermined length A1 is, as seen from FIG. 4A, a length set in advance so that force exerted on the rotor 44 by the floating magnets 38 and 46 is greater than friction force M1 acting between the stationary axis 24 and the rotary axis 28 of the optical deflector 10. Thereby, in the optical deflector horizontally placed, even if the gravity does not act on the rotor 44 in contact with the disengagement prevention member 54, the floating magnets 38 and 46 exert enough force to return the rotor 44 to the predetermined position on the rotor 44, so that the rotor 44 returns to the predetermined position.

Figure 4B:
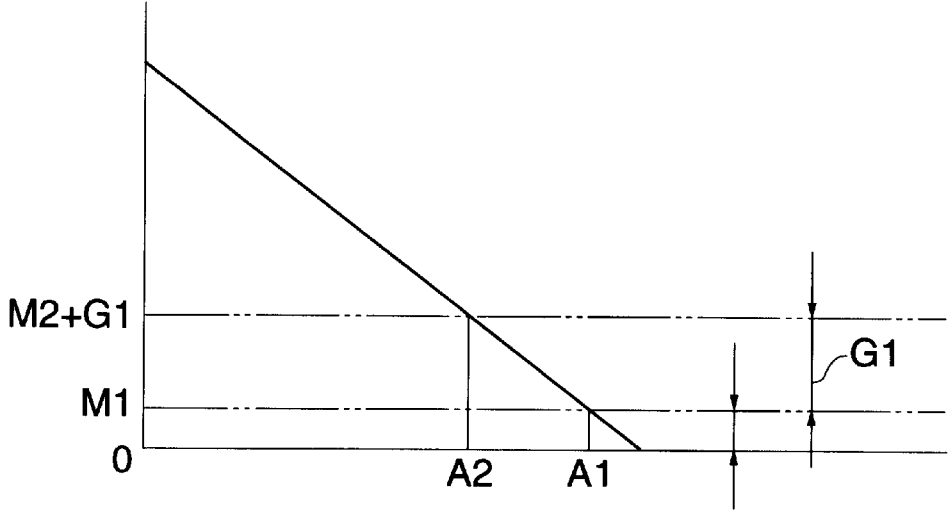
FIG. 4B shows the inverted placement of the optical deflector.

As shown in FIG. 3B, when the optical deflector 70 is inversely placed, the disengagement prevention member 54 is attached to the stationary axis 24 so that the length X2 of the gap 64 is shorter than a predetermined length A2 (see FIG. 4B) The predetermined length A2 is, as seen from FIG. 4B, a length set in advance so that force exerted on the rotor 44 by the floating magnets 38 and 46 is greater than the combined force of friction force M1 acting between the stationary axis 24 and the rotary axis 28 of the optical deflector 70 and the gravity G1 acting on the rotor 44. Thereby, in the optical deflector 70 inversely placed, even if the gravity acts on the rotor 44 in contact with the disengagement prevention member 54 in the direction that causes the rotor 44 to approach the disengagement prevention member 54 (the reverse direction of the arrow R), the floating magnets 38 and 40 exert enough magnetic force to return the rotor 44 to the predetermined position on the rotor 44, so that the rotor 44 returns to the predetermined position.

When the optical deflector 70 is obliquely placed, force acting on the rotor 44 in the removal direction (the axis direction component of the gravity G1) is smaller than the gravity G1 itself. Therefore, in the optical deflector 70 obliquely placed, the floating magnets 38 and 46 exert enough magnetic force on the rotor 44 in contact with the disengagement prevention member 54 to return it to the predetermined position, so that the rotor 44 returns to the predetermined position.

In this way, in the optical deflector 70 of the second embodiment, in addition to the operation and effects of the optical deflector 10 of the first embodiment, when the optical deflector 70 is horizontally, inversely, or obliquely placed, even if the rotor 44 moves in the disengagement direction due to impact or the like, the rotor 44 is returned to a predetermined position by the magnetic force of the floating magnets 38 and 46. Consequently, the optical deflector 70 can be thereafter used without trouble.

Third Embodiment

Figure 5A:
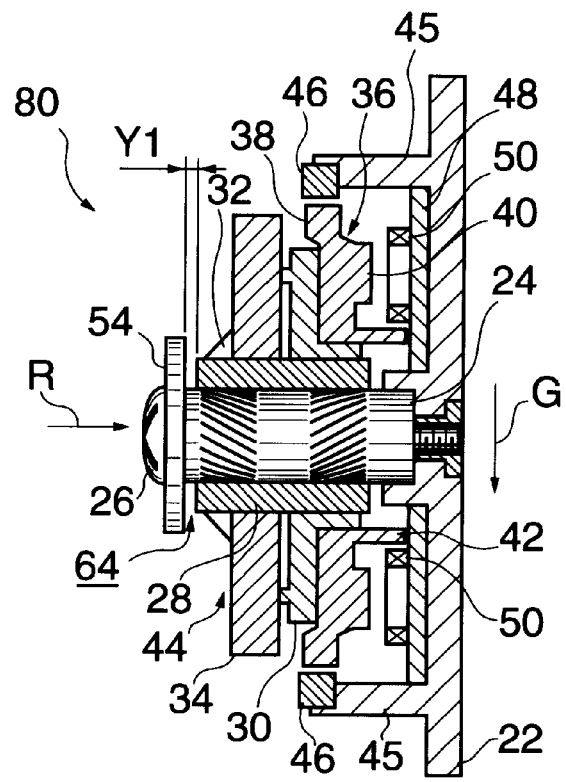
FIG. 5A shows the vertical placement of the optical deflector.
Figure 5B:
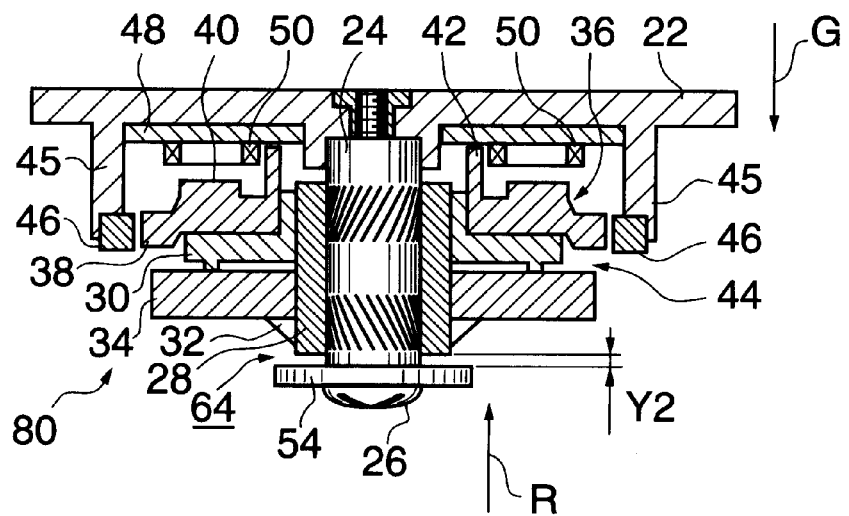
FIG. 5B shows the inverted placement of the optical deflector.
Figure 6A:
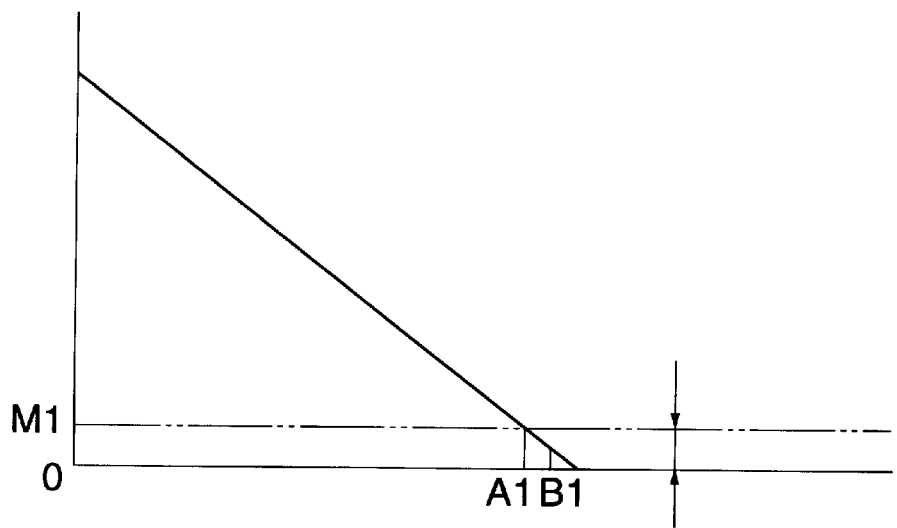
FIG. 6A shows the vertical placement of the optical deflector.
Figure 6B:
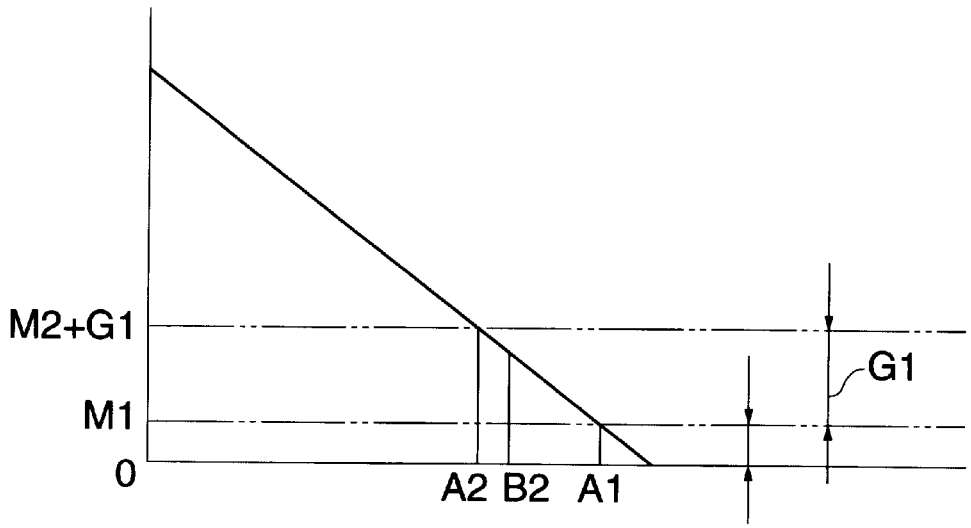
FIG. 6B shows the inverted placement of the optical deflector.

FIGS. 5A and 5B are the respective views of the horizontal placement and inverted placement of an optical deflector 80 of a third embodiment of the present invention. Since a basic configuration of the optical deflector 80 of the third embodiment is the same as that of the optical deflector 10 of the first embodiment and the optical deflector 70 of the second embodiment, identical components and members are assigned identical reference numerals and a description of them is omitted. In FIGS. 5A and 5B, only the optical deflector 80 is shown and an overall configuration of an optical scanner is omitted. However, the overall configuration of an optical scanner is also the same as that of the first embodiment.

In the optical deflector 80 of the third embodiment, a gap 64 formed between one end of the rotor 44 in the axial direction and the disengagement prevention member 54 is set to predetermined lengths Y1 and Y2 for the horizontal placement and the inverted placement of the optical deflector 80, respectively. This is the result of taking into account the fact that the rotor 44 temporarily moves to the coils 50 when driven, and then vibrates in the axial direction at that position.

Specifically, in the optical deflector 80 of the third embodiment, as shown in FIG. 7, when the rotor 44 is driven when in contact with the disengagement prevention member 54, magnetic attraction acts between the coils 50 and driving magnets 40 at the start of rotation. The rotor 44 temporarily moves to the coils 50 and vibrates in the axial direction at that position (let a maximum displacement amount at this time be B3), and then makes steady rotation, at which time the rotor 44 rotates stably in a predetermined position of the axial direction. Accordingly, if the rotor 44 enters the range of the magnetic force of the floating magnets 38 and 46 due to vibration when driven, the rotor 44 is returned to a predetermined position by the magnetic force.

For example, as shown in FIG. 5A, when the optical deflector 80 is horizontally placed, the disengagement prevention member 54 is attached to the stationary axis 24 so that the length Y1 of the gap 64 is shorter than a predetermined length B1. The predetermined length B1 is set to satisfy an expression (B1−A1≈B3), taking into account the maximum displacement amount B3 (see FIG. 7) of vibration of the rotor 44 and the predetermined length A1 when the optical deflector 70 of the second embodiment is horizontally placed. The length B1 is longer than A1. If the length Y1 of the gap 64 is thus set shorter than the predetermined length B1, in the optical deflector 80 horizontally placed, since the rotor 44 enters the range of the magnetic force of the floating magnets 38 and 46 at least when the vibration of the rotor 44 changes to a maximum, the rotor 44 is returned to the predetermined position by the magnetic force.

As shown in FIG. 5B, when the optical deflector 80 is inversely placed, the disengagement prevention member 54 is attached to the stationary axis 24 so that the length Y2 of the gap 64 is shorter than a predetermined length B2. The predetermined length B2 is set to satisfy an expression (B2−A2≈B3), taking into account the maximum displacement amount B3 (see FIG. 7) of vibration of the rotor 44 and the length A2 of the gap 64 when the optical deflector 70 of the second embodiment is inversely placed (as a result, the gravity G1 acting on the rotor 44 is taken into account). Since the gravity G1 acts on the rotor 44 opposite in direction to the return to a predetermined position, generally B1<B2. The predetermined length B2 is greater than A2. If the length Y2 of the gap 64 is set shorter than the predetermined length B2, in the optical deflector 80 inversely placed, even if the gravity acts on the rotor 44 in the direction that causes the rotor 44 to approach the disengagement prevention member 54 (the reverse direction of the arrow R), since the rotor 44 enters the range of the magnetic force of the floating magnets 38 and 46 at least when the vibration of the rotor 44 changes to a maximum, the rotor 44 is returned to the predetermined position by the magnetic force.

In this way, in the optical deflector 80 of the third embodiment, the gap 64 can be made wider than that in the second embodiment by the maximum displacement amount B3 when the rotor 44 is driven. When the rotor 44 is driven to rotate, the rotor 44 moves to the range of the magnetic force of the floating magnets 38 and 44 du e t o vibration an d is returned to a predetermined position by the magnetic force of the floating magnets 38 and 44. Consequently, the optical deflector 70 can be thereafter used without trouble.

Fourth Embodiment

Figure 8A:
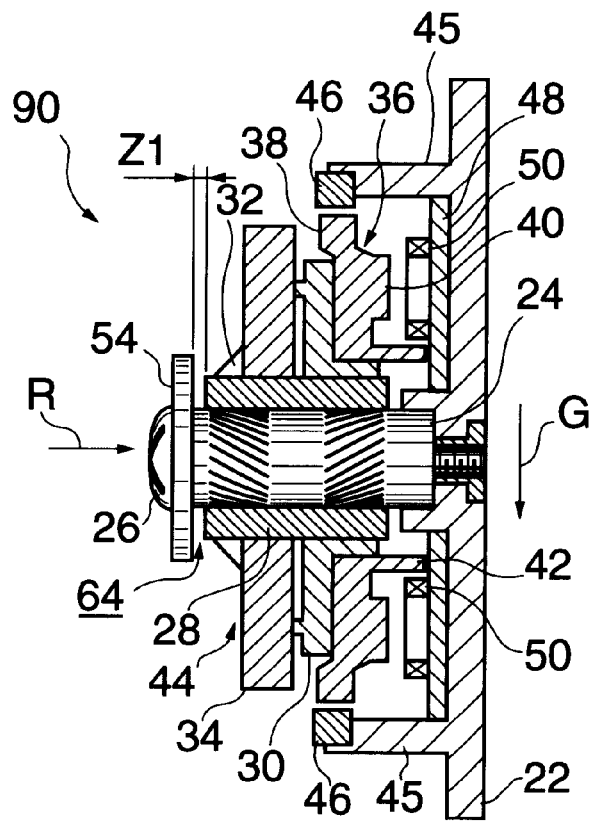
FIG. 8A shows the vertical placement of the optical deflector.
Figure 8B:
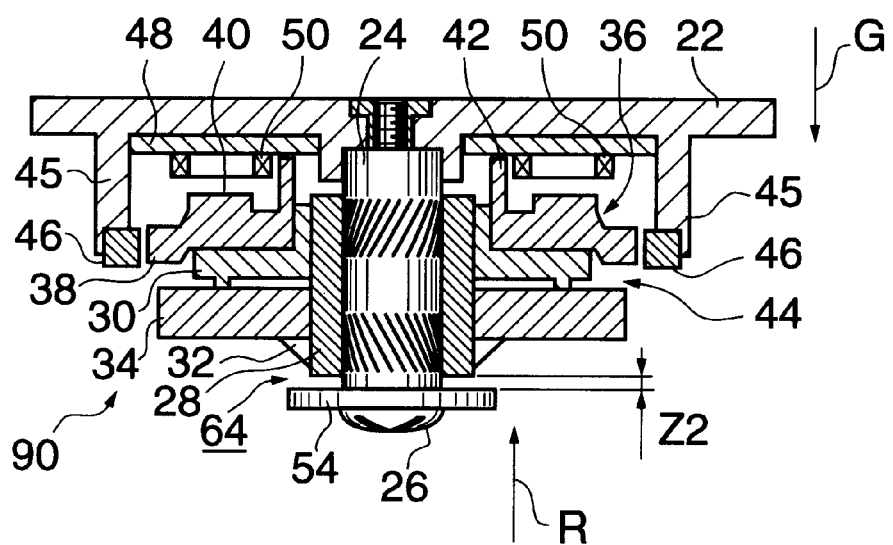
FIG. 8B shows the inverted placement of the optical deflector.
Figure 9A:
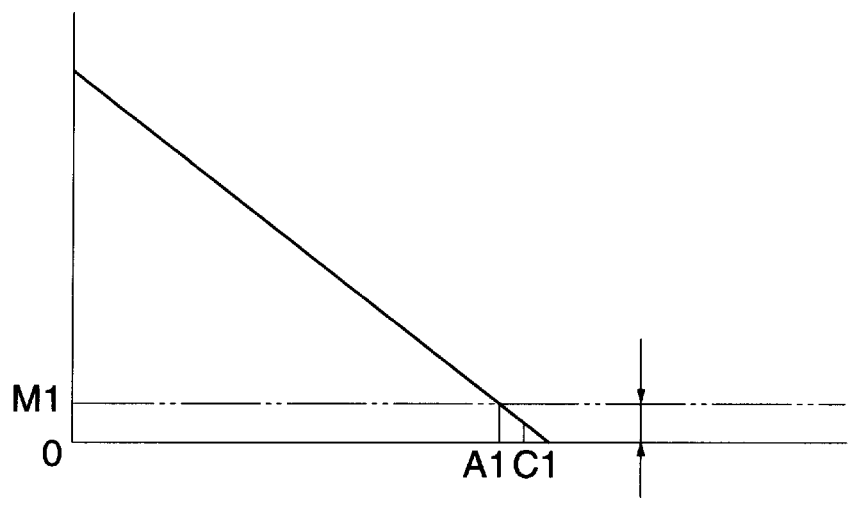
FIG. 9A shows the vertical placement of the optical deflector.
Figure 9B:
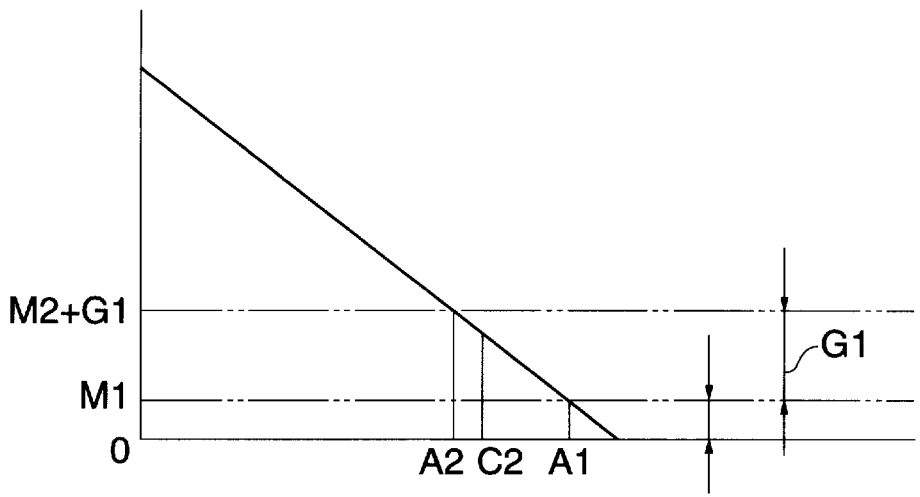
FIG. 9B shows the inverted placement of the optical deflector.

FIGS. 8A and 8B are the respective views of the horizontal placement and inverted placement of an optical deflector 90 of a fourth embodiment of the present invention. Since a basic configuration of the optical deflector 90 of the fourth embodiment is the same as that of the optical deflector 10 of the first embodiment and the optical deflector 70 of the second embodiment, and the optical deflector 80 of the third embodiment, identical components and members are assigned identical reference numerals and a description of them is omitted. In FIGS. 8A and 8B, only the optical deflector 90 is shown and an overall configuration of an optical scanner is omitted. However, the overall configuration of an optical scanner is also the same as that of the first embodiment.

In the optical deflector 90 of the third embodiment, a gap 64 formed between one end of the rotor 44 in the axial direction and the disengagement prevention member 54 is set to predetermined lengths Z1 and Z2 for the horizontal placement and the inverted placement of the optical deflector 90, respectively. This is the result of taking into account the fact that the rotor 44 temporarily moves to the disengagement prevention member 54 when driven, and moves to the coils 50 by repulsion from the disengagement prevention member 54 in the axial direction at that position.

Figure 10:
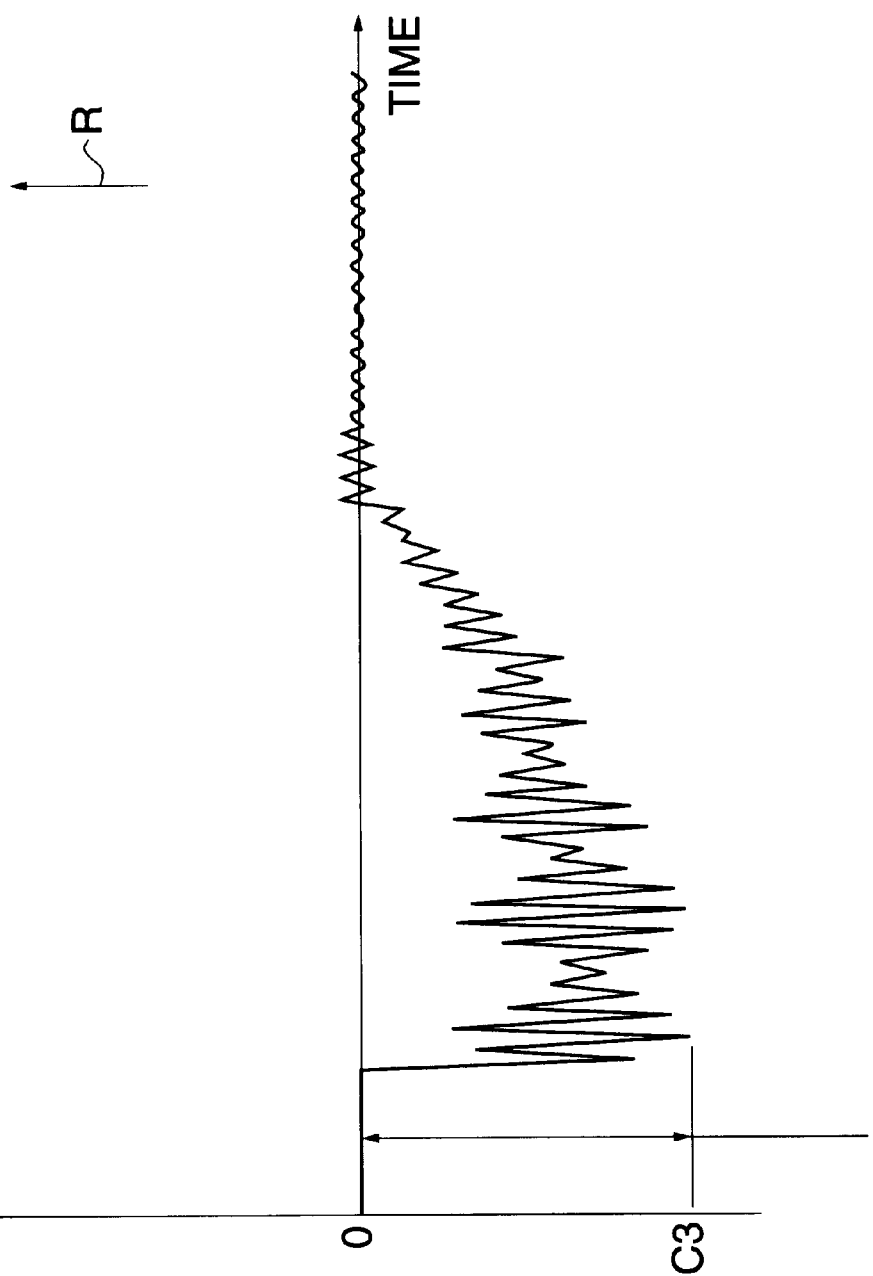
FIG. 10 is a graph qualitatively showing time vibration of the rotor in the optical deflector according to the fourth embodiment of the present invention in the axial direction at the initial stage of rotation.

Specifically, in the optical deflector 90 of the fourth embodiment, as shown in FIG. 10, when the rotor 44 is driven when in contact with the disengagement prevention member 54, the rotor 44 temporarily moves in the direction that causes the rotor 44 to move away from the coils (the direction that approaches the disengagement prevention member 54) at the start of rotation, vibrates in the axial direction at that position (let a maximum displacement amount at this time be C3), and then makes steady rotation, at which time the rotor 44 rotates stably in a predetermined position of the axial direction. In the optical deflector 90 of this type, when the disengagement prevention member 54 is pushed in by the movement of the rotor 44, repulsion of the disengagement prevention member 54 causes the rotor 44 to move to the coils 50 from the position of contact with the disengagement prevention member 54 (hereinafter this phenomenon will be referred to as "swing"). Accordingly, if the rotor 44 enters the range of the magnetic force of the floating magnets 38 and 46 due to the swing, the rotor 44 is returned to the predetermined position by the magnetic force.

For example, as shown in FIG. 8A, when the optical deflector 90 is horizontally placed, the disengagement prevention member 54 is attached to the stationary axis 24 so that the length Z1 of the gap 64 is shorter than a predetermined length C1. The predetermined length C1 is set to satisfy an expression (C1−A1≈C3), taking into account the maximum displacement amount C3 (see FIG. 10) of vibration of the rotor 44 and the predetermined length A1 when the optical deflector 70 of the second embodiment is horizontally placed. The length C1 is longer than A1. If the length X1 of the gap 64 is thus set shorter than the predetermined length C1, in the optical deflector 90 horizontally placed, since the rotor 44 enters the range of the magnetic force of the floating magnets 38 and 46 during a swing due to the vibration of the rotor 44, the rotor 44 is returned to the predetermined position by the magnetic force.

As shown in FIG. 8B, when the optical deflector 90 is inversely placed, the disengagement prevention member 54 is attached to the stationary axis 24 so that the length Z2 of the gap 64 is shorter than a predetermined length C2. The predetermined length C2 is set to satisfy an expression (C2−A2≈C3), taking into account the maximum displacement amount C3 (see FIG. 10) of vibration of the rotor 44 and the length A2 of the gap 64 when the optical deflector 70 of the second embodiment is inversely placed (as a result, the gravity G1 acting on the rotor 44 is taken into account). Since the gravity G1 acts on the rotor 44 opposite in direction to the return to a predetermined position, generally C1<C2. The predetermined length C2 is greater than A2. If the length Z2 of the gap 64 is set shorter than the predetermined length C2, in the optical deflector 90 inversely placed, even if the gravity acts on the rotor 44 in the direction that causes the rotor 44 to approach the disengagement prevention member 54 (the reverse direction of the arrow R), since the rotor 44 enters the range of the magnetic force of the floating magnets 38 and 46 during a swing of the vibration of the rotor 44, the rotor 44 is returned to the predetermined position by the magnetic force.

In this way, in the optical deflector 90 of the fourth embodiment, the gap 64 can be made wider than that in the second embodiment by the maximum displacement amount C3 when the rotor 44 is driven. Even if the rotor 44 is in contact with the disengagement prevention member 54, when the rotor 44 is driven to rotate, the rotor 44 moves to the range of the magnetic force of the floating magnets 38 and 46 due to vibration and is returned to a predetermined position by the magnetic force of the floating magnets 38 and 44. Consequently, the optical deflector 70 can be thereafter used without trouble.

As has been described above, each of the optical deflector 70 of the second embodiment, the optical deflector 80 of the third embodiment, and the optical deflector 90 of the fourth embodiment can be horizontally, obliquely, and inversely placed, providing greater freedom in the layout of the optical deflectors 70, 80, and 90 within an optical scanner and an image formation apparatus. Thereby, an optical scanner and an image formation apparatus can be made compact as a whole.

The structure and shape of the disengagement prevention member 54 are not limited to those described above; in effect, the disengagement prevention member 54 may be whatever can, when the rotor 44 moves in the axial direction, contact at least part of the rotor 44 and prevent the rotor 44 from disengaging. In view of this, preferably, the disengagement prevention member 54 has prescribed elasticity so that it is elastically deformed when pressed by the rotor 44 upon contact with it, and can return the rotor 44 to a predetermined position by repulsion thereof. This is true of, to obtain sufficient repulsion, particularly the type of the optical deflector 90 of the fourth embodiment, which returns the rotor 44 that temporarily moves away from the coils 50 and contacts the disengagement prevention member 54, in the direction that approaches the coils 50.

Concrete materials of the disengagement prevention member 54 having such prescribed elasticity include, e.g., polyamide materials such as nylons 6 and 66, polyimide and polyacetal materials. These polyamide, polyimide, and polyacetal materials are particularly desirable because they generally have low friction coefficients and high wear resistance, and therefore contact with the rotor 44 causes no damage on both the rotor 44 and the disengagement prevention member 54.

Figure 11A:
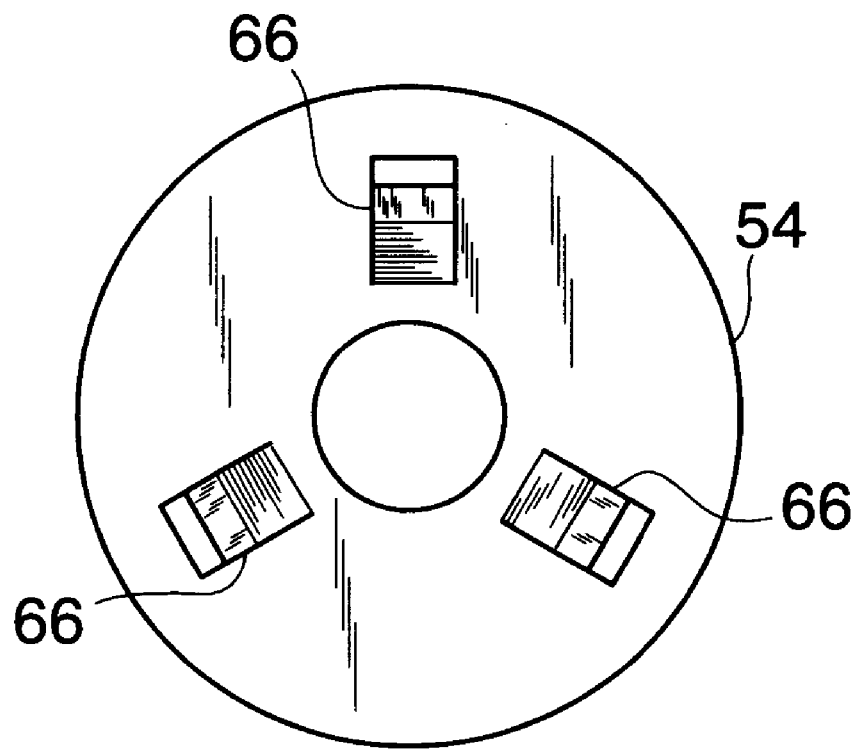
FIG. 11A is a plan view and FIG. 11B is a front view.
Figure 11B:
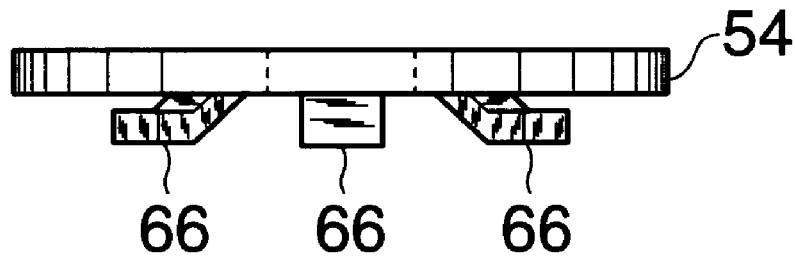

The disengagement prevention member 54 may be not only like a ring in shape, but also, for example, as shown in FIG. 11, have such a shape that flat spring slips 66 are formed by forming approximately U-shaped notches in the board thickness direction of the disengagement prevention member 54 and bending the inner portions of the notches toward the rotor 44. Since contact of the rotor 44 with the flat spring flats 66 causes the flat spring slips 66 to be elastically deformed, sufficient repulsion is exerted on the rotor 44, causing the rotor 44 to return to a predetermined position.

Figure 12A:
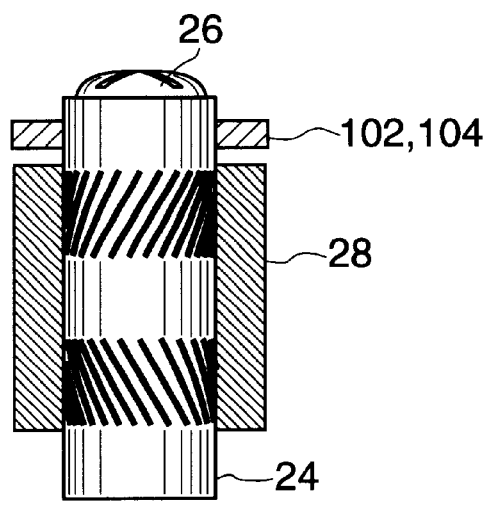
FIG. 12A is a front view of the stationary axis to which a generally available part, as a disengagement prevention member of the present invention, is directly attached.
Figure 12B:
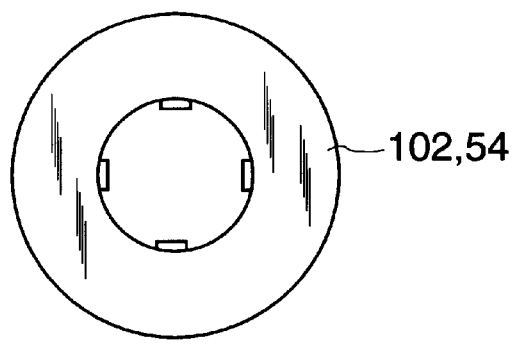
FIG. 12B is a plan view of a CS snap ring used as the disengagement prevention member.
Figure 12C:
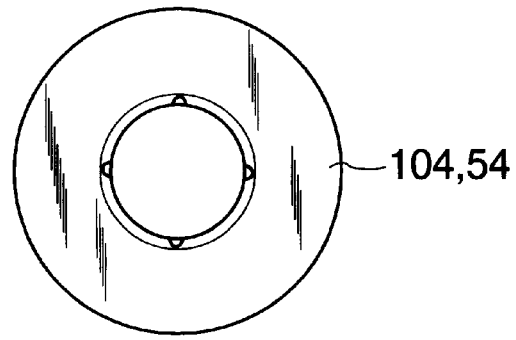
FIG. 12C is a plan view of a push nut used as a disengagement prevention member 54.

As the disengagement prevention member 54, there may be used generally available parts such as a CS snap ring 102 shown in FIG. 12B, a push nut 104 shown in FIG. 12C, and an E ring not shown. These generally available part, when used, may be fitted directly to the stationary axis 24, as shown in FIG. 12A, without being secured to the stationary axis 24 by the fixing screws 26.

Figure 13:
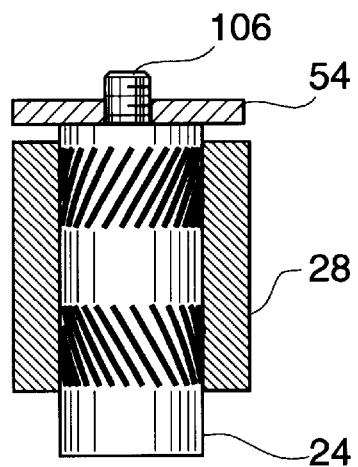
FIG. 13 is a cross-sectional view of a disengagement prevention member of the present invention, screwed to a shaft mounted in the stationary axis.
Figure 14:
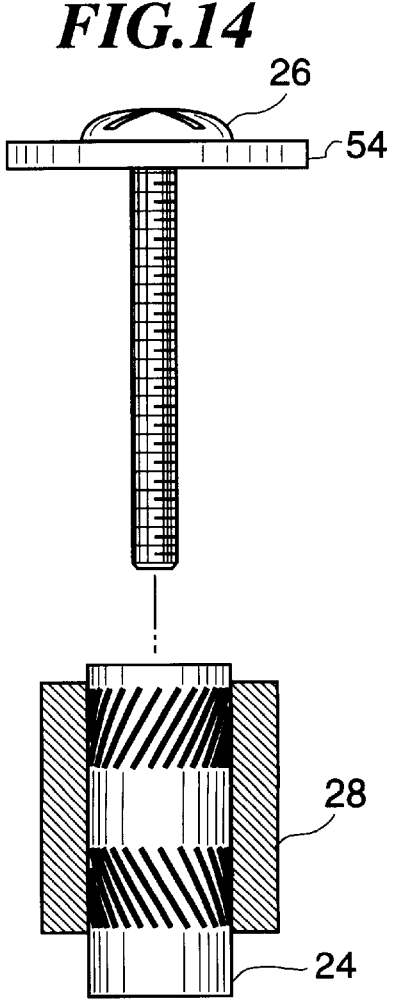
FIG. 14 is a front view of a disengagement prevention member of the present invention, molded integrally with a fixing bolt.
Figure 15:
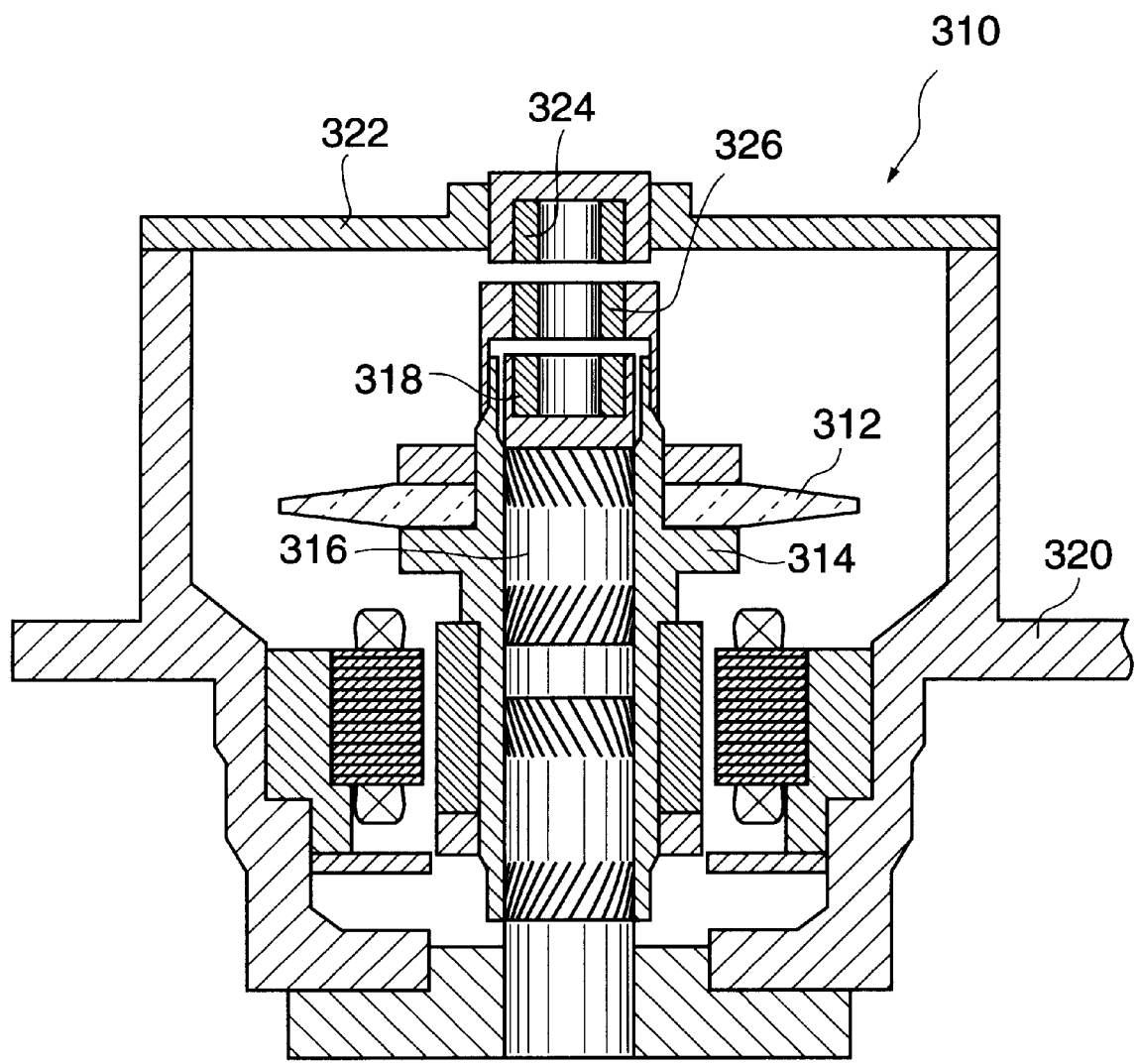
FIG. 15 is a front view of a conventional optical deflector.
Figure 16:
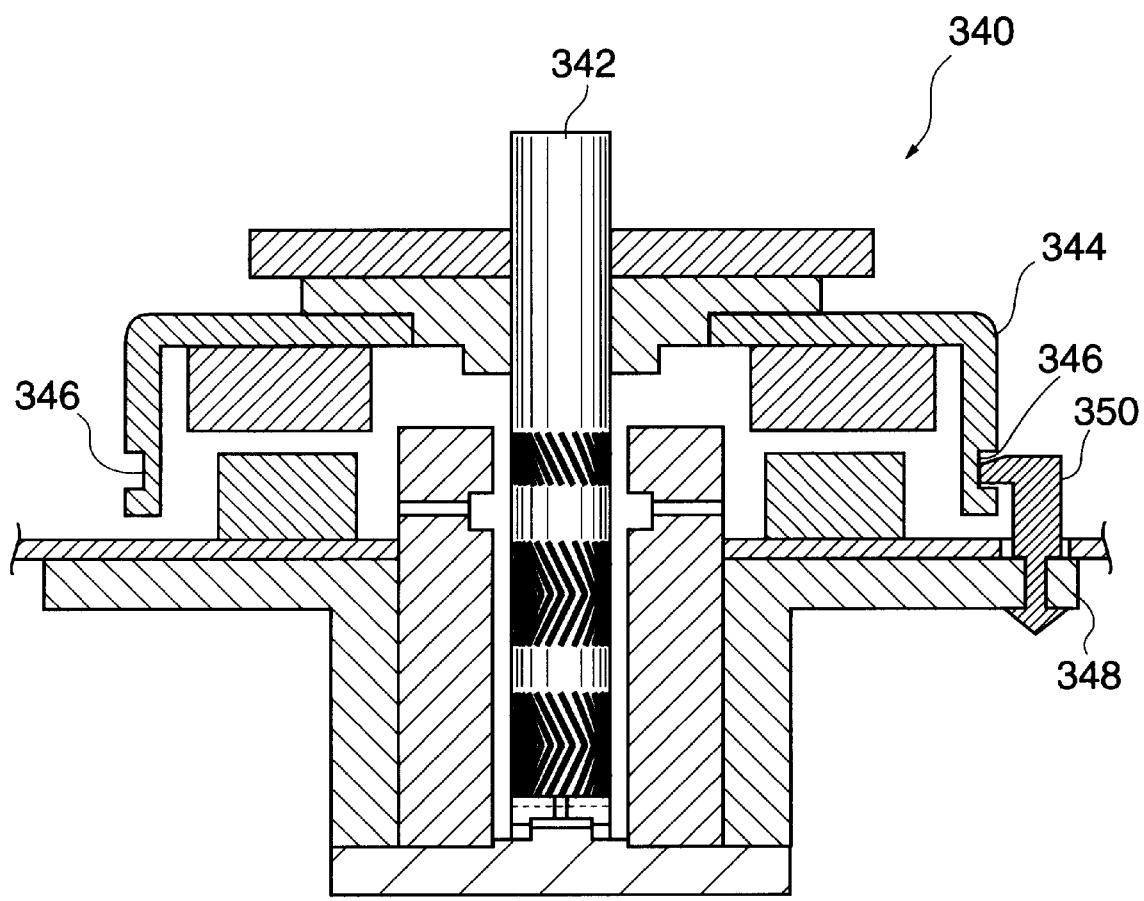
FIG. 16 is a front view of a conventional optical deflector.
Figure 17:
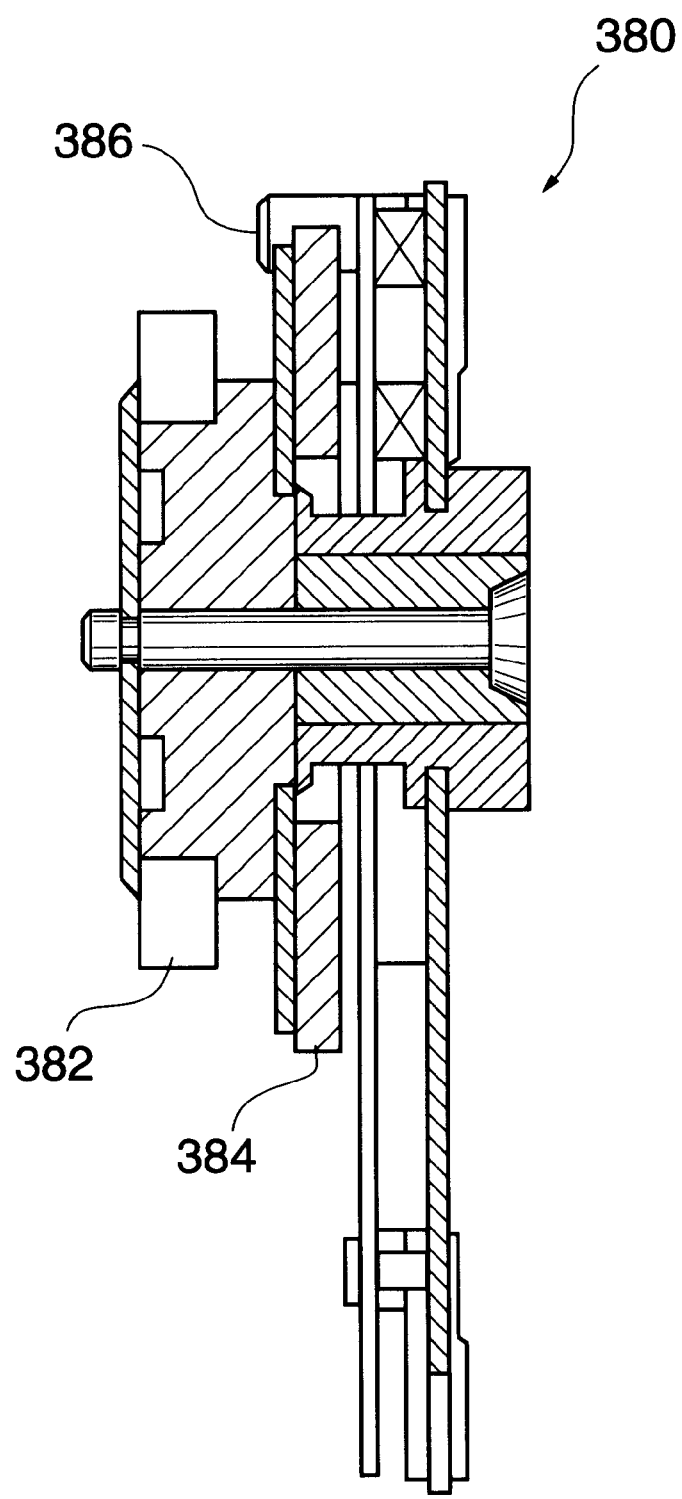
FIG. 17 is a cross-sectional view of a conventional optical deflector.

Furthermore, as shown in FIG. 13, a shaft 106 in which a male screw thread is formed may be provided in the stationary axis 24 in order that the disengagement prevention member 54 is screwed to the shaft 106. Also, as shown in FIG. 14, the disengagement prevention member 54 may be constructed integrally with the fixing screw 26 so that the head of the fixing screw 26 is larger in diameter than the inner diameter of the rotor 44, and thereby substantially plays the role of the disengagement prevention member 54 (in other words, a shaft in which a male screw thread is formed is formed in the disengagement prevention member 54 itself and the shaft is fitted to the stationary axis 24 by being screwed to it).

The vicinity of the tip of the stationary axis 24 may be expanded to a circular shape larger in diameter than the inner diameter of the rotor 44 so that the portion expanded in diameter substantially plays the role of the disengagement prevention member 54. This constructionally integrates the stationary axis 24 and the disengagement prevention member 54, reducing the number of parts.

The optical deflector set forth in claim 1 comprises: a stationary axis; a rotor including at least a rotary axis disposed with a predetermined gap from the stationary axis and capable of rotating about the stationary axis, a rotary polygon mirror rotating integrally with the rotary axis, and driving magnets attached to at least one of the rotary axis and the rotary polygon mirror; holding magnets for holding the rotor at a predetermined holding position in the axial direction of the stationary axis by magnetic force; and a disengagement prevention member, mounted in the vicinity of an end of the stationary axis in the axial direction with a predetermined gap in the axial direction from the rotor, coming into contact with the rotor moving in the axial direction and preventing the rotor from disengaging from the stationary axis. Thereby, the rotary polygon mirror can be rotated at high speed, images of high quality can be formed at high speed, durability and reliability are improved, and disengagement of the rotary from the stationary axis can be prevented with a simple construction.

What is claimed is:

1. An optical deflector comprising:

a stationary axis;

a rotor including at least a rotary axis disposed with a predetermined gap from said stationary axis and capable of rotating about the stationary axis, a rotary polygon mirror rotating integrally with said rotary axis, and driving magnets attached to at least one of said rotary axis and said rotary polygon mirror;

holding magnets for holding said rotor at a predetermined holding position in the axial direction of said stationary axis by magnetic force; and a disengagement prevention member, mounted in the vicinity of an end of said stationary axis in the axial direction with a predetermined gap in the axial direction from said rotor, coming into contact with said rotor moving in the axial direction and preventing said rotor from disengaging from said stationary axis.

2. The optical deflector according to claim 1, wherein said disengagement prevention member is fitted to said stationary axis so that said rotor contacts with said disengagement prevention member at a position within the range of the magnetic force of said holding magnets capable of holding said rotor at said holding position.

3. The optical deflector according to claim 1, wherein said disengagement prevention member is fitted to said stationary axis so that said rotor driven to rotate in contact with said disengagement prevention member is moved in the axial direction by suction from said driving magnets at a position within the range of the magnetic force of said holding magnets capable of holding said rotor at said holding position.

4. The optical deflector according to claim 1, wherein said disengagement prevention member is fitted to said stationary axis so that a position where said rotor driven to rotate in contact with said disengagement prevention member is moved in the axial direction by repulsion from said driving magnets and further moved in the opposite direction thereof by counterforce from said disengagement prevention member is within the range of the magnetic force of said holding magnets capable of holding said rotor at said holding position.

5. The optical deflector according to claim 1, wherein said disengagement prevention member is disposed so that it contacts with said rotary axis.

6. The optical deflector according to claim 1, wherein said disengagement prevention member has elasticity in said axial direction.

7. The optical deflector according to claim 6, wherein at least part of said disengagement prevention member is molded by a resin.

8. The optical deflector according to claim 7, wherein a resin forming said disengagement prevention member is a polyamide, polyimide, or polyacetal resin.

9. An optical scanner, comprising:

the optical deflector according to claim 1;

an imaging unit that images light deflected by a rotary polygon mirror making up said optical deflector; and an image holding member to which light imaged by said imaging unit is irradiated and on which an image is formed by relative movement to a direction orthogonal to a direction in which the light is deflected.

* * * * *